Sept. 25, 1956  J. K. BRIXIUS  2,764,257
EDGE FILTER PANEL WITH UNEVEN FACE
Filed Aug. 19, 1953

INVENTOR.
JACOB K. BRIXIUS
BY
Hyde, Meyer, Baldwin & Doran
ATTORNEYS

United States Patent Office 2,764,257
Patented Sept. 25, 1956

2,764,257
EDGE FILTER PANEL WITH UNEVEN FACE

Jacob K. Brixius, Cleveland, Ohio, assignor to Air-Maze Corporation, Cleveland, Ohio, a corporation of Delaware Application August 19, 1953, Serial No. 375,122

2 Claims. (Cl. 183—69)

This invention relates to improvements in a filter panel for filtering particles out of a gaseous stream. My invention is useful in that type of filter panel wherein a plurality of sheets of filter material are arranged in a panel with the sheets extending generally in the direction of the flow of the gaseous stream and with each sheet having corrugations or other means for holding the sheets spaced so that the sheets of filter material are presented to the gaseous stream in "edge-on" relationship. It is well-known that in this type of filter, a great percentage of the particles caught are collected at the upstream edge of the sheets of filter material. Where such material contains a large amount of lint, the face of the filter panel becomes covered over or felted with bits of lint, so as to greatly increase the resistance of the panel to the flow of the gaseous stream through it. It is an object of the present invention to provide a filter panel of the type above described having the "edge-on" filter construction wherein the upstream edges of some of the sheets of filter material extend farther upstream than the edges of others of said sheets so as to present a panel which is uneven with respect to the face where the gaseous stream enters. I find as a result of this construction, that more particles of dirt, dust and the like may be collected at the upstream face of the filter panel using my invention than utilizing the older type of panel wherein all of the sheets of filter material ended in substantially a common plane at the upstream face of the filter. I find also, that using this construction, as shown in my improved panel herein described, a larger amount of lint will collect on the upper face of the panel before the resistance of the filter panel builds up to an undesirable point.

In the drawings, Fig. 1 is a perspective view of a filter panel embodying my invention. Fig. 2 is a fragmental sectional view taken along the line 2—2 of Fig. 1 enlarged and somewhat diagrammatic and with the layers broken away to more clearly show the construction.

Fig. 4 is a fragmental perspective view of a sheet of imperforate material corrugated for use in one of the layers of my improved filter panel, while

Figure 1:
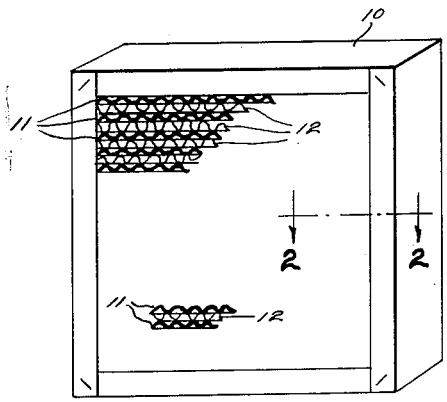

Referring now to Fig. 1, the filter panel is built up within a rectangular frame 10 by placing alternate layers 11 and 12 of filter material in the panel with each layer extending generally from front to back of the filter in the general direction of the flow of the gaseous stream through the panel. This is accomplished usually by leaving one side of the frame 10 open until the panel is filled with layers of material after which the fourth side of the frame is closed. The frame is generally built of channel form material as best seen in Figs. 2 and 3.

Each layer of the filter material is provided with some sort of uneven surface so that it will not nest with the layers above and below it in the filter panel. The easiest manner I have discovered for so separating the layers is to provide each layer with a plurality of parallel crimps. These crimps or corrugations are shown in Figs. 2, 3, 4 and 5 as being of Z form, but it will be understood that my invention may also be applied where the corrugations are of V form or where the corrugations extend straight through the panel at an angle to the general direction of stream flow, or where the alternate layers are provided with separating bumps so as to maintain a spacing between adjacent layers in the panel. The invention as applied to the uneven character of the upstream face of the panel regardless of how the layers of the panel are separated.

Figure 4:
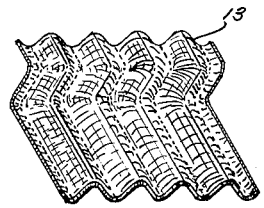
Figure 5:
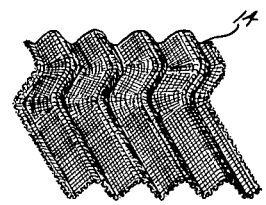
Fig. 5 is a view similar to Fig. 4 showing a corrugated sheet of foraminous material for use in one of the layers of my improved filter panel.

In Fig. 4 I have shown a sheet 13 of imperforate material such as heavy paper, metal or metal foil crimped for use in one form of my invention. In Fig. 5 I have shown a sheet 14 of foraminous material crimped for use as a layer in carrying out my invention and this material might be the sheet of Fig. 4 perforated, but preferably is of screen mesh material.

Figure 2:
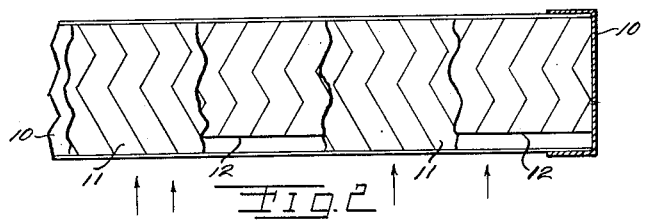
Figure 3:
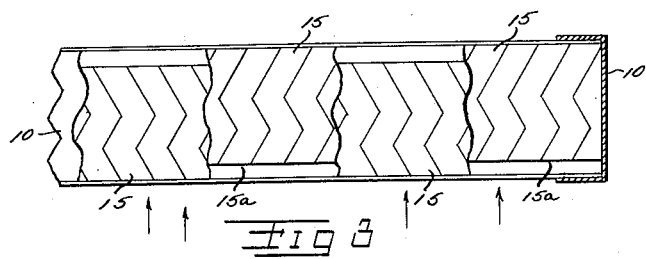
Fig. 3 is a view similar to Fig. 2 and showing another modification of my invention.

While I have shown the bends in the corrugations in Figs. 2 and 3 as placed at varying distances from the front of the panel as taught in my copending application Serial No. 375,162, filed August 19, 1953, and entitled "Filter Panel with Zig-Zag Corrugations," it will be understood by those skilled in this art that the invention of my copending application need not necessarily be applied in the present invention.

In Fig. 2, the layer 11 shown farthest to the left in the view has its upstream reading edge extending farther upstream than the leading edge of the next layer below it indicated at 12. The next layer below that is again a layer 11 having its upstream edge extended forwardly from the panel, while the next layer below that shown at the right in Fig. 2 is again a layer 12 having its edge recessed from the front of the panel.

In a preferred form of my invention, half of the layers of the panel have their leading edges approximately ⅛ inch to ¼ inch upstream from the leading edges of the alternate or other half of said layers.

My invention may be applied by having every other sheet 11 extend forwardly beyond the alternate sheets 12, so that the leading edges of every other layer are staggered as shown in Fig. 2. However, those familiar with this art will understand that I may also provide my panel with a leading edge 11 extending forwardly, then two layers 12, having their leading edges rearwardly of the layer 11, then another layer 11 extending forwardly, then two more layers 12 rearwardly.

In the modification of Fig. 3, I have shown my invention as utilizing layers all of which are identical as contrasted with Fig. 2 where part of the layers have less depth in the direction of flow through the panel than certain other layers. In Fig. 3, alternate layers are turned upside down, but the first layer 15 shown at the left in Fig. 3 has its leading edge extending outwardly in advance of the edge 15a of the next layer below it. However, since the layers are of the same width, the second layer has its downstream edge extending outwardly from the downstream face of the panel. The third layer next below the second is like the first described layer and the fourth layer next below the third (seen at the right in Fig. 3) is like the second described layer. The advantage of the construction of Fig. 3 over that shown in Fig. 2 is that it is more cheaply built because the layers of filter material may be crimped exactly the same and alternate layers turned upside down when assembling the panel. Also, the panel of Fig. 3 may be put in the gaseous stream with either face upstream and it will then embody my invention whereas the filter of Fig. 2, if it is not placed as shown in the drawings, with the gaseous stream flowing in the direction of the arrows, one will not obtain the advantages of my invention.

To prove the advantages of my invention, I constructed and tested two filter panels each composed of 9-point kraft paper having parallel crimps approximately $3/16$-inch deep and 6 crimps per inch. This paper was oiled with a mineral oil which was a modified type SAE-40. Each of these panels was approximately 2 inches thick from front to rear, but one of the panels was constructed as shown in Fig. 3 with a distance between the leading edges 15 and 15a of about $3/16$ of an inch. The other panel was assembled with the leading edges of all of the layers ending in a substantially common plane. I ran identical tests on these two panels utilizing a Bureau of Standards dust containing 96% Cottrell dust and 4% lint. In these comparative tests, each panel was run until the resistance through the panel reached one-half inch water gauge. The panel constructed according to my invention, as shown in Fig. 3, ran for 32 hours before reaching one-half inch water gauge resistance, whereas the panel constructed according to the prior art and having all of the layers of filter material ending in a common plane unstream, ran for only 25 hours before reaching one-half inch water gauge resistance. In the above-mentioned comparative tests, the filter panel constructed according to my invention as shown in Fig. 3 not only ran for a longer period of time before reaching a predetermined resistance to the flow of air through it, but also the panel constructed according to my invention had a slightly higher efficiency than the panel constructed according to the prior art which ran for only twenty-five hours.

While I have described my invention wherein the panel is encased in a frame, I may also use the same construction without a standard frame around the edge thereof. In other words, the layers of the filter material may be secured to each other either by fastening means running through all the layers or, in case the layers are of kraft or other paper material, by adhesive holding the layers together, in such a case the panel of filter material may be cut to the outline of the holding frame into which frames such as the previously described frame 10 are easily held so that my filter panel may function in such a holding frame until it becomes dirty, after which it may be pulled out and thrown away and a new panel placed in the holding frame.

What I claim is:

1. In a filter for removing entrained particles from a gaseous stream, a plurality of sheets of filter material, means holding said sheets in substantially contiguous superposed relationship and extending generally in the direction of the flow of said gaseous stream, said sheets having corrugations non-nesting with the corrugations of adjacent sheets, said sheets having their leading edges lying substantially in planes at right angles to the direction of stream flow, and every other sheet having its leading edge extending upstream beyond the leading edges of the adjacent sheets of each side of it.

2. The combination of claim 1 wherein half of said sheets have their leading edges approximately 1/8 inch to 1/4 inch upstream from the leading edges of the other half of said sheets.

References Cited in the file of this patent

UNITED STATES PATENTS

| | | |
|---|---|---|
| 2,286,479 | Farr | June 16, 1942 |
| 2,403,261 | Clark | July 2, 1946 |
| 2,548,584 | Briggs | Apr. 10, 1951 |
| 2,555,125 | Gregory | May 29, 1951 |
| 2,567,030 | Schaaf | Sept. 4, 1951 |